Figure 1:
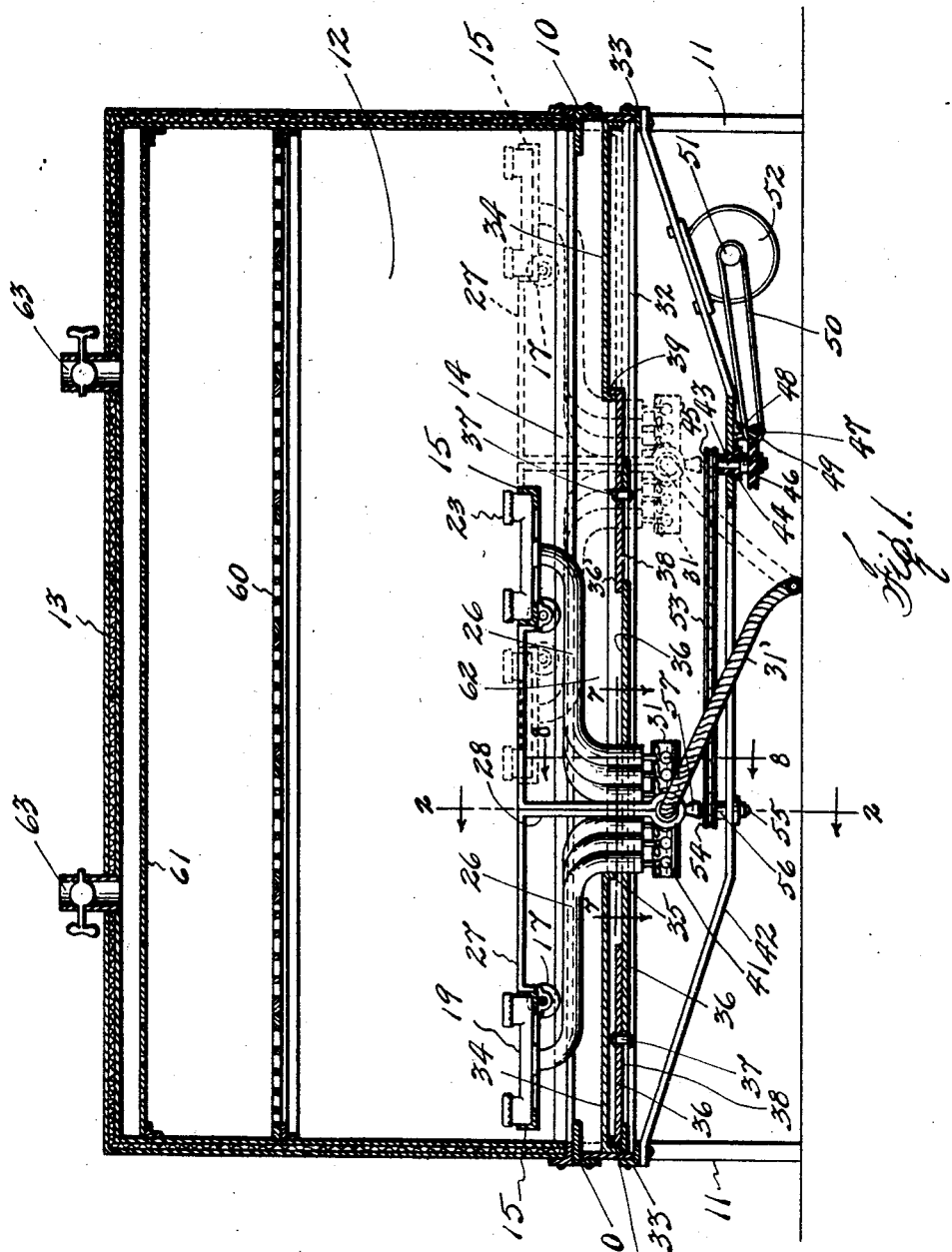

Jan. 1, 1929.

L. D. HOULIS

BAKING OVEN

Filed July 30, 1926

1,697,357

3 Sheets-Sheet 1

Inventor
L. D. Houlis

By

Attorney

Jan. 1, 1929.
L. D. HOULIS
BAKING OVEN
Filed July 30, 1926
1,697,357
3 Sheets-Sheet 2
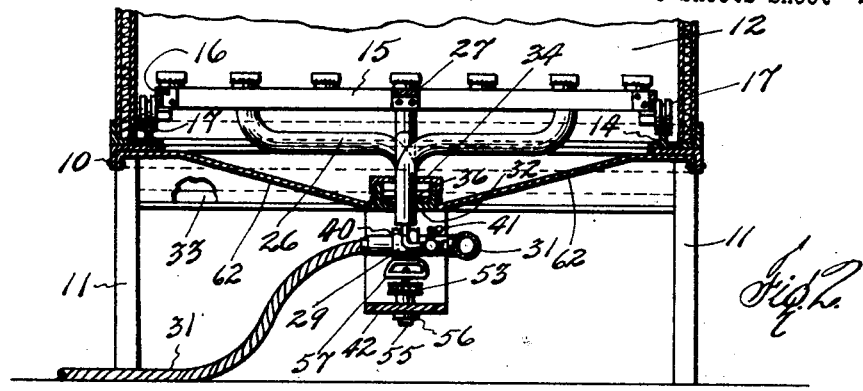
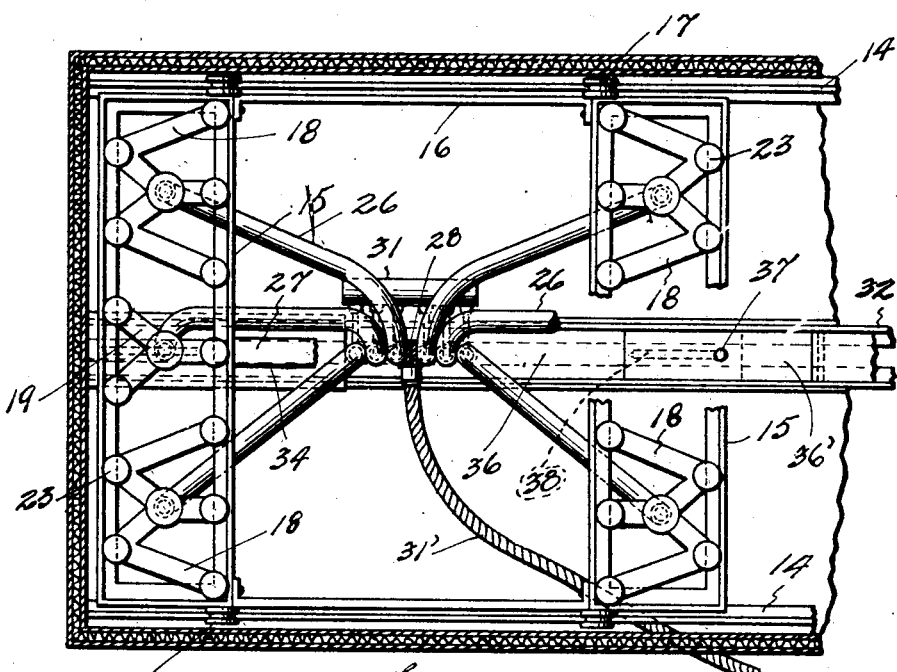
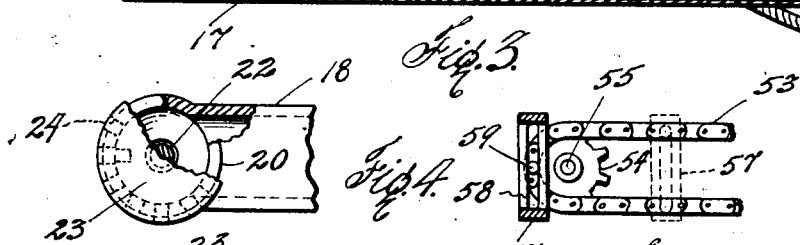
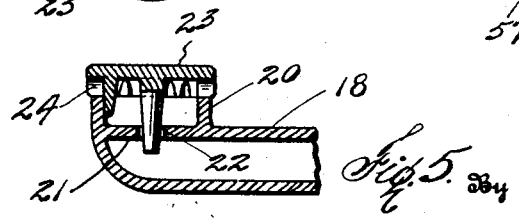
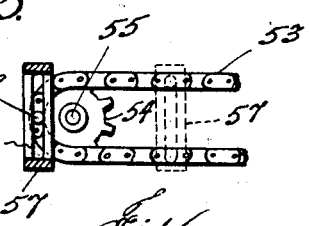
Inventor
L. D. Houlis
Attorney

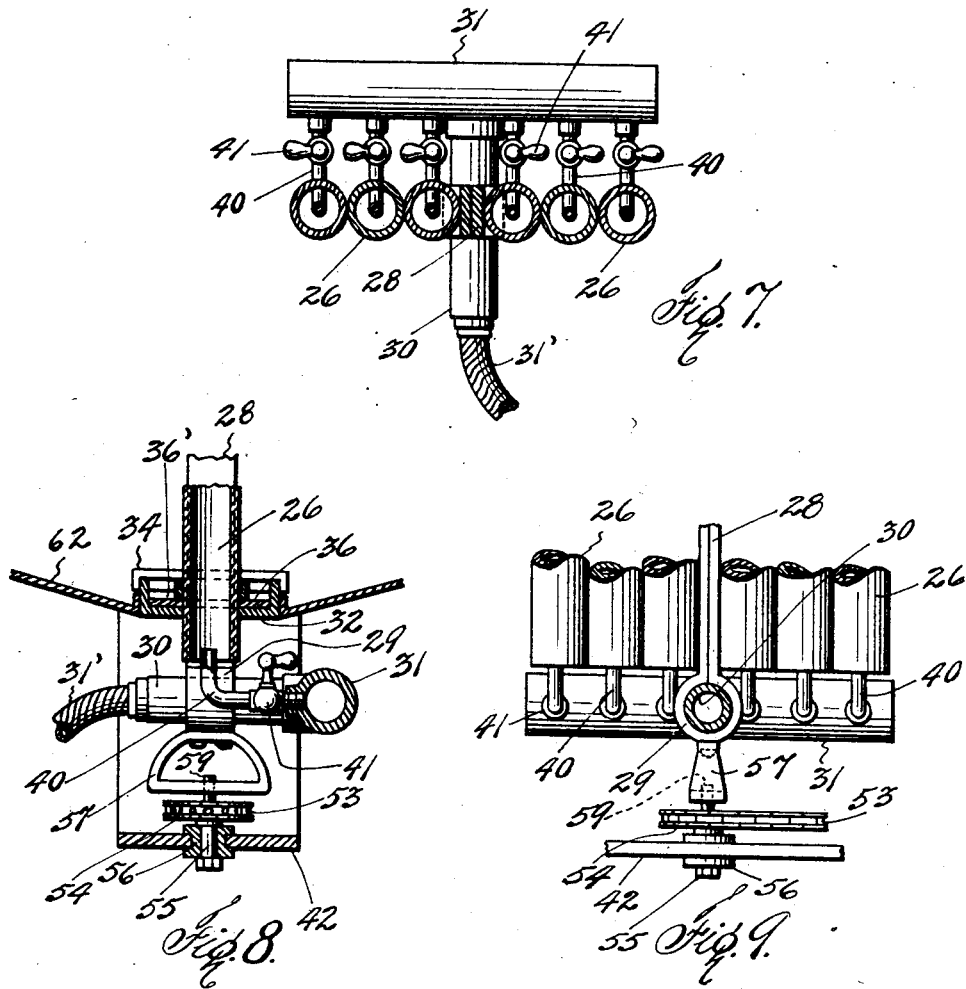

Patented Jan. 1, 1929.

1,697,357

UNITED STATES PATENT OFFICE.

LOUIS D. HOULIS, OF DALLAS, TEXAS.

BAKING OVEN.

Application filed July 30, 1926. Serial No. 126,078.

This invention relates to new and useful improvements in baking ovens.

The object of the invention is to provide an oven in which an even distribution of heat will be had throughout the entire baking chamber and which will be free from heat obstructing supports, shelves and the like.

A particular object of the invention is the elimination of so-called hot and cold spots, thus making for even and regular baking.

Another object of the invention is to provide an oven in which the heating element is reciprocated under the baking grille, whereby more efficient baking is obtained, fuel is saved and much quicker action is secured.

A still further object of the invention is to provide an oven in which the baking pans are supported on a stationary grille, whereby their contents are substantially free from vibration and the rising heat currents are spread and distributed and caused to take direct upward paths.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a longitudinal vertical sectional view of an oven constructed in accordance with my invention, Fig. 2 is a transverse sectional view taken on the line 2—2 of Fig. 1, Fig. 3 is a partial horizontal cross-sectional view, Fig. 4 is a detail of one of the burners, Fig. 5 is a sectional view of one of the burners, Fig. 6 is a detail of the burner shifting means, Fig. 7 is an enlarged horizontal cross-sectional view taken on the line 7—7 of Fig. 1, Fig. 8 is an enlarged transverse sectional view taken on the line 8—8 of Fig. 1, and Fig. 9 is a detail of the manifold and component parts.

In the drawings the numeral 10 designates a base frame which is supported on legs 11. An oven 12 having its side and end walls and top 13 formed of heat insulating material, is mounted upon the base frame. The base frame extends inwardly along each side of the oven and tracks 14 are secured thereon.

Burner carriers in the form of rectangular flanged frames 15 are connected by bars 16 to form a rigid carrier unit. Each frame is provided at each end with a grooved roller 17 resting on the tracks. While any suitable gas burners may be mounted on the frames 15, I prefer to use the manifold type and have shown two W shapes 18 and one Y shape 19 resting on the flanges of each frame. Each manifold has a plurality of burner collars 20, each having a bottom 21 with a central aperture 22 (Figs. 4 and 5). A cap 23 having a depending notched flange 24 is fitted on each collar and each cap has a central depending tapered stud 25 extending through the opening 22 and reducing the area of the latter. When the burner is operating this stud will become hot, thus preheating the gas as it passes through the restricted openings 22.

Each burner manifold has a supply pipe 26 leading from its underside. A hanger comprising top arms 27 and a depending central shank 28 having a loop 29 at its bottom, is mounted between the burner frames. The ends of the arms are fastened to the center of the frames. In the loop is fastened the nipple 30 of a manifold head 31. A flexible gas supply pipe 31' (Figs. 7 and 8) is connected to the nipple.

A central longitudinal guide 32 formed of angle irons has its ends supported on cross bars 33 secured to the legs 11 below the base frame 10. The ends of the guide are covered by plates 34 having down-turned flanges 35 at their inner ends. This leaves a space at the central portion of the guide between flanged plates. The ends of the pipes 26 are turned down on each side of the hanger shank 28 and suitably fastened thereto so as to move therewith. These pipes extend through a slide plate 36 mounted in said guide. Adjustable end members 36' are mounted on the slide plate and each has a depending headed stud 37 engaging in a slot 38 in the slide plate. Each plate 36 has an upturned flange 39 adapted to engage the flange 35 in its path.

The manifold head 31 has angular gas jets 40 including cocks 41. The jets have their ends extending up into the lower ends of the supply pipes 26 which are much larger so as to admit the proper amount of air. It will be seen that when the hanger is moved along the guide 32, the head 31, pipes 26 and burner frames 15 being attached thereto will likewise be moved thereby. At each end of its travel the burner unit will have its pipes 26 adjacent one of the flanges 35. As the slide plate 36 approaches the end of the oven the flange 39 of the forward end member 36' strikes the end wall and by reason of the stud 37 and slot 38, further movement of the member is prevented, but the slide plate continues until the end of the stroke. The trailing member 36' is carried by the slide until its flange 39 engages the flange 35, whereby it is extended. By this arrangement the guideway is kept closed.

While any suitable means may be employed for reciprocating the hanger, I prefer an electric motor drive. An under slung bar 42 is suspended from the cross bars 33 under the guide 32. A vertical drive shaft 43 mounted in a bearing 44 in said bar has a sprocket 45 fastened on its upper end and a worm wheel 46 secured to its lower end under the bar. The worm is driven by a worm screw 47 suspended in a bearing bracket 48 and having a pulley 49. The shaft is driven by a belt 50 running from the pulley to a pulley 51 on the shaft of an electric motor 52.

A sprocket chain 53 passing around the sprocket 45 drives a sprocket 54 mounted on a vertical shaft 55 in a bearing collar 56 in the bar 42. The sprockets are suitably spaced to give the burner unit the proper travel. A stirrup 57 is secured to the bottom of the loop 29 and has a transverse slot 58 (Figs. 6, 8 and 9) for receiving a pin 59 extending upwardly from the chain 53. By this connection the hanger is reciprocated. When the stirrup reaches the end of a stroke the pin will travel in the slot 58 while rounding the sprocket.

The burner frames 15 are spaced so that each will come nearly to, but not cross, the transverse center of the oven and while one burner frame is adjacent the center the other is at one end of the oven. Thus as the burner frames are reciprocated, substantially the entire length of the oven is traversed and evenly heated.

Some distance above the burners, I mount a stationary grille 60 of suitable construction. The pans or trays containing the dough to be baked are placed on this grille, a proper door (not shown) giving access thereto. A false roof or ceiling 61 is mounted immediately below the top 13 and is perforated. Bottom plates 62 extending from the sides of the bar 42 up to the sides of the base frame 10 exclude air from the bottom of the oven. The heat currents from the burners pass directly up through the grille 60 and escape through the perforations of the roof 61. A pair of vents 62 in the top 13 are spaced so as to draw the currents equally from each half of the oven, whereby the direct upward trend of the heat currents is maintained.

It is obvious that the reciprocating burners will heat evenly and there will be no hot or cold spots. There being no obstructions between the burners and the grille 60, the pans on the latter will be adequately heated in a quick and efficient manner, thus saving fuel and making for economical operation and maintenance.

Various changes in the size and shape of the different parts, as well as modifications and alterations, may be made within the scope of the appended claims.

While I have shown a grille for supporting the articles to be baked, it is to be understood that any form of support may be used and it is not essential that this support be foraminous.

What I claim, is:

1. In a baking oven, a baking support, tracks along each side of the oven below the support, a pair of spaced carrier frames having rollers mounted on said tracks, burners carried by said fames and deposited transversely of the oven, a manifold head attached to said carrier frames, supply pipes leading from said head to the burners, and means for driving the manifold and the frames.

2. In a baking oven, the combination with reciprocating burner carriers of a hanger attached thereto, a manifold head carried by the hanger, burners in the carriers connected with the head, an endless sprocket chain, a connection between the hanger and the chain, and a motor for driving the same.

3. In a baking oven, the combination with a reciprocating burner carrier, of a guide-way, a hanger depending from the carrier through the guide-way, a slide member for closing the guide-way, and means for reciprocating the hanger.

4. In a baking oven, a stationary grille in the upper portion of the oven extending longitudinally thereof, a burner unit mounted to reciprocate at the lower portion of the oven below the grille, and means for continuously reciprocating the burner unit longitudinally in the oven while said burner is ignited.

5. In a baking oven, a longitudinal enclosed baking chamber, a stationary baking support arranged longitudinally in the upper portion of the chamber, a burner support arranged longitudinally in the bottom of the chamber, a burner mounted for longitudinal movement on said support in the lower portion of the chamber, and means for constantly reciprocating said burner on its support longitudinally of the chamber while the oven is in operation.

6. In a baking oven, a longitudinal enclosed baking chamber, a stationary baking support mounted in the upper portion of the chamber and longitudinally thereof, a burner movable longitudinally in the lower portion of the chamber below the baking support, and means for constantly reciprocating the burner substantially the entire length of the baking support while the oven is in operation.

7. In a baking oven, a longitudinal enclosed baking chamber, a stationary baking support mounted longitudinally in the upper portion of the chamber, a carriage arranged to reciprocate at the bottom of the chamber longitudinally thereof, burners mounted on said carriage, and motor means for reciprocating said burner carriage while the oven is in operation.

8. In a baking oven, a longitudinal enclosed baking chamber, a stationary baking support mounted longitudinally in the upper portion of the oven, a carriage arranged to reciprocate at the bottom of the chamber longitudinally thereof, burners mounted on said carriage, and means for constantly reciprocating the carriage longitudinally of the baking support while the oven is in operation.

9. In a baking oven, a longitudinal enclosed baking chamber, a stationary grille mounted longitudinally in the upper portion of the chamber, tracks mounted along each side of the chamber at the bottom thereof, a burner carriage mounted to reciprocate on said tracks, burners carried by said carriage, and motor means for continuously reciprocating said carriage while the oven is in operation.

10. In a baking oven, a longitudinal enclosed baking chamber, a baking support extending longitudinally in the upper portion of the chamber, tracks along each side of the bottom of the chamber, a carriage mounted to reciprocate on said tracks, burners mounted on each end of the carriage and disposed transversely of the chamber, said burners being spaced apart so that when the burner at one end of the carriage is at the end of the chamber the other burner will be at the central portion of the chamber, and means for reciprocating said carriage.

In testimony whereof I affix my signature.

LOUIS D. HOULIS.